(12) United States Patent
Abbasi et al.

(10) Patent No.: US 10,176,321 B2
(45) Date of Patent: Jan. 8, 2019

(54) LEVERAGING BEHAVIOR-BASED RULES FOR MALWARE FAMILY CLASSIFICATION

(71) Applicant: FireEye, Inc., Milpitas, CA (US)

(72) Inventors: Fahim H. Abbasi, Lahore (PK); Abdul Salam, Lahore (PK); Farrukh Shahzad, Lahore (PK)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/967,180

(22) Filed: Dec. 11, 2015

(65) Prior Publication Data

US 2017/0083703 A1     Mar. 23, 2017

(51) Int. Cl.
*G06F 21/00*     (2013.01)
*G06F 21/56*     (2013.01)

(52) U.S. Cl.
CPC .......... *G06F 21/561* (2013.01); *G06F 21/566* (2013.01)

(58) Field of Classification Search
CPC ...... G06F 21/566; G06F 21/554; G06F 21/52; G06F 21/53; G06F 21/56; G06F 21/572
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |

(Continued)

FOREIGN PATENT DOCUMENTS

| | | |
|---|---|---|
| GB | 2439806 A | 1/2008 |
| GB | 2490431 A | 10/2012 |

(Continued)

*Primary Examiner* — Ghazal B Shehni
(74) *Attorney, Agent, or Firm* — Rutan & Tucker, LLP

(57) ABSTRACT

According to one embodiment, a malware classification scheme operating with an electronic device, configured with one or more hardware processors and a memory that stores the software handling the malware classification scheme that is conducted through analysis of behavior-based rules, is described. This malware classification scheme (i) conducts a determination whether a sequence of rules correspond to potential malicious behaviors detected during analysis of a malware sample within one or more virtual machines, and in response to determining that the sequence of rules corresponds to potential malicious behaviors, (ii) conducts an attempt to classify the malware sample to at least one known malware family based on an analysis of the sequence of rules.

33 Claims, 5 Drawing Sheets

(56) References Cited

U.S. PATENT DOCUMENTS

| | | |
|---|---|---|
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,042,186 B1 | 10/2011 | Polyakov et al. |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,388 B1 * | 10/2013 | Wang .................. H04L 63/1416 709/245 |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,607,349 B1 | 12/2013 | Zaitsev |

(56) References Cited

U.S. PATENT DOCUMENTS

| | | |
|---|---|---|
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,376 B2 | 5/2014 | Rieschick et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,850,579 B1 | 9/2014 | Kalinichenko |
| 8,881,234 B2 | 11/2014 | Narasimhan et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,935,779 B2 | 1/2015 | Manni et al. |
| 8,978,142 B2 | 3/2015 | Zaitsev |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,202,053 B1 | 12/2015 | Huang et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,356,944 B1 | 5/2016 | Aziz |
| 9,367,681 B1 | 6/2016 | Ismael et al. |
| 9,432,389 B1 | 8/2016 | Khalid et al. |
| 9,438,613 B1 | 9/2016 | Paithane et al. |
| 9,483,644 B1 | 11/2016 | Paithane et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,905 B1 | 3/2017 | Ismael et al. |
| 9,594,912 B1 | 3/2017 | Thioux et al. |
| 9,628,498 B1 | 4/2017 | Aziz et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,838,411 B1 | 12/2017 | Aziz |
| 9,838,417 B1 | 12/2017 | Khalid et al. |
| 9,846,776 B1 | 12/2017 | Paithane et al. |
| 9,888,019 B1 | 2/2018 | Pidathala et al. |
| 9,892,261 B2 | 2/2018 | Joram et al. |
| 9,912,684 B1 | 3/2018 | Aziz et al. |
| 9,934,376 B1 | 4/2018 | Ismael |
| 9,934,381 B1 | 4/2018 | Kindlund et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van De Ven |

(56) References Cited

U.S. PATENT DOCUMENTS

| | | |
|---|---|---|
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101430 A1 | 5/2007 | Raikar |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0241974 A1 | 9/2010 | Rubin et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |

(56) References Cited

U.S. PATENT DOCUMENTS

| | | |
|---|---|---|
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Razier et al. |
| 2011/0173460 A1 | 7/2011 | Ito et al. |
| 2011/0173677 A1 | 7/2011 | Tarbotton et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0302648 A1 | 12/2011 | Yoo |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0307957 A1 | 12/2011 | Aziz et al. |
| 2011/0314546 A1 | 12/2011 | Aziz et al. |
| 2011/0314547 A1 | 12/2011 | Yoo |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1* | 10/2012 | Sallam .................. G06F 21/554 726/22 |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1* | 4/2013 | Titonis .................. G06F 21/56 726/24 |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0312098 A1 | 11/2013 | Kapoor et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181897 A1 | 6/2014 | Zaitsev |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0245374 A1 | 8/2014 | Deerman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0026809 A1 | 1/2015 | Altman et al. |
| 2015/0096022 A1 | 4/2015 | Vincent et al. |
| 2015/0096023 A1 | 4/2015 | Mesdaq et al. |
| 2015/0096025 A1 | 4/2015 | Ismael |
| 2015/0096027 A1 | 4/2015 | Romanenko et al. |
| 2015/0121450 A1 | 4/2015 | Chen et al. |
| 2015/0121526 A1* | 4/2015 | McLarnon ............ H04L 63/14 726/23 |
| 2015/0163234 A1 | 6/2015 | Tal et al. |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0112440 A1 | 4/2016 | Kolton et al. |
| 2016/0127393 A1 | 5/2016 | Aziz et al. |
| 2016/0224791 A1 | 8/2016 | Yamamoto et al. |
| 2017/0013018 A1 | 1/2017 | Nakata et al. |
| 2017/0091451 A1 | 3/2017 | Kovac |
| 2017/0201532 A1 | 7/2017 | Go et al. |
| 2018/0083987 A1 | 3/2018 | Kislitsin |

FOREIGN PATENT DOCUMENTS

| | | |
|---|---|---|
| WO | 02/06928 A2 | 1/2002 |
| WO | 02/23805 A2 | 3/2002 |
| WO | 2007-117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

* cited by examiner

LEVERAGING BEHAVIOR-BASED RULES FOR MALWARE FAMILY CLASSIFICATION

FIELD

Embodiments of the disclosure relate to the field of cyber-security, and more specifically, to the labeling of malware classes and the classification of malware into its relevant classes based on its malicious behavior.

GENERAL BACKGROUND

Malicious software or "malware" has become a pervasive problem for corporations and individual users alike, as the functionality of most electronic devices is influenced by downloaded data. Normally, electronic devices communicate with trusted resources and download data that is free of malware. However, there are occasions where an electronic device communicates with a particular resource, even a trusted resource, but the electronic device receives downloaded data that contains malware. When loaded in an electronic device, malware may adversely affect its operability and may attempt to compromise a local network by attempting to propagate the malware from the electronic device to other electronic devices connected to the local network.

Given the increased presence of malware, the security vendors have been developing systems and tools to protect electronic devices by detecting a presence of malware within data received as input. Due to the continuous and growing volume of released malware, however, security vendors are faced with a substantial challenge in accurately classifying detected malware. Currently, malware is classified by mapping the received (input) data into pre-defined categories of malware (hereinafter "malware classes"). However, as samples may vary greatly from each other, especially due to increasingly sophisticated (and morphing) malware and inconformity with malware classification by security vendors, many conventional classification techniques are not designed to handle malware variants.

In fact, some classification techniques tend to experience a high level of false positives when attempting to cluster (group) different (but highly related) malware into malware classes. This high level of false positives may also be due, at least in part, to the presence of "white noise"; namely, the presence of benign (or non-pertinent) behaviors that have no influence in determining whether the malware should be classified as part of a certain class or not. A reduction of false positives by removal of the "white noise" would improve overall system reliability and speed of malware detection.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
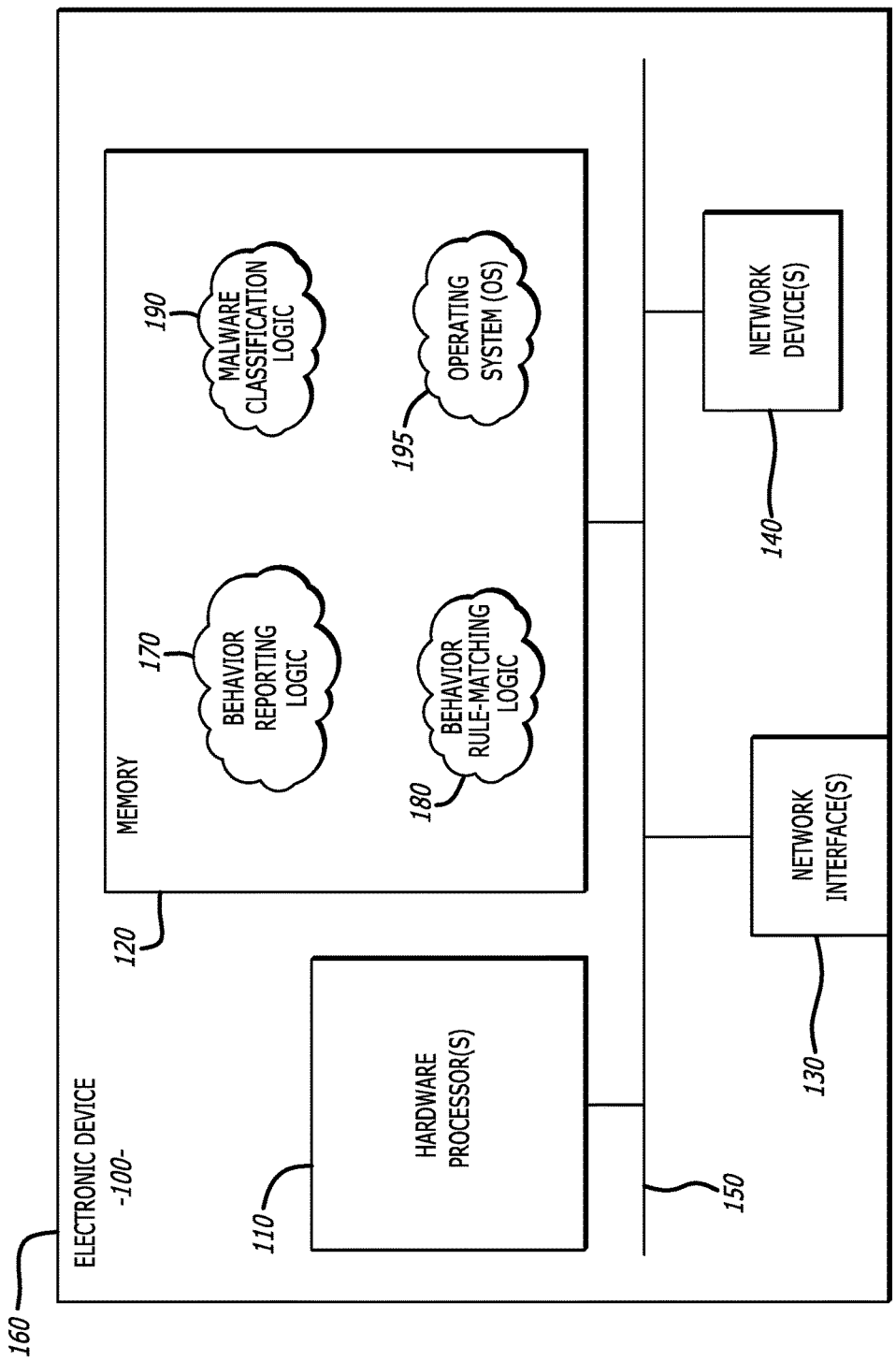
FIG. 1 is an exemplary block diagram of an electronic device that is configured to conduct rule-based behavior analysis for malware family classification.

Various embodiments of the disclosure are directed to an electronic device, system and method for detecting and classifying malware. More specifically, one embodiment of the disclosure relates to logic that is configured to analyze and classify input data as part of a particular malware class based upon a detected sequence of rules triggered during processing of the input data. Herein, the input data is malicious as being associated with known malware or exhibiting behaviors that suggest that the input data includes malware (hereinafter referred to as a "malware sample"). The input data is processed and a particular behavior or a pattern of selected behaviors exhibited by the processed sample are monitored (hereinafter generally referred to as "monitored behaviors"). The monitored behaviors, which normally are a subset of the behaviors exhibited by the malware sample during processing, may be selected through the placement of interception points within one or more software components processing the input data, where the interception points allow information associated with these behaviors to be captured by monitoring logic.

More specifically, during processing of the malware sample, salient information observed during processing is received by a threat detection system. The threat detection system may be configured as part of cloud services, may include an active agent operating in run-time, or may include one or more virtual machines with at least some of the operations being conducted in a sandboxed environment. The salient information may include state information associated with the virtual machine. Additionally, the salient information may include information associated with the monitored behaviors. The monitored behaviors may include a communication-based anomaly or an execution-based anomaly that (a) unexpectedly alters the functionality of an electronic device (e.g., causes application software to conduct operations in an atypical manner such as an unexpected attempt to access a particular file, registry or process, or even an attempt to access the network); and/or (b) provides unwanted functionality which may be generally acceptable in another context.

According to one embodiment, at least some of the salient information associated with the monitored behaviors is maintained in a chronological order based on when the behaviors were monitored. This chronological sequence of information may be initially placed in a prescribed format (sometimes referred to as an "event summary"). A plurality of pre-defined rules associated with malicious behaviors (i.e., behaviors known or suspected to cause unwanted or unexpected activities to occur) are applied to the chronological sequence of monitored behaviors that are part of the event summary. This produces a first sequence of rules that is included as part of a rule sequence report (e.g., rules, metadata associated with behaviors, etc.). The first sequence of rules includes a subset of the pre-defined rules that are triggered in response to a presence of certain behaviors within the event summary and the chronological order of these triggered rules is consistent with the chronological order of the monitored behaviors.

Some or all of the first sequence of rules, sometimes referred to as a "rule aggregation sequence," serve as a fingerprint of the malware sample. This aggregation sequence may be used to map the malware sample to a certain class (family type) of malware (hereinafter referred to as a "malware class"). According to this embodiment, the rule aggregation sequence is a subset of the first sequence of rules, as some rules in the first sequence of rules may have little significance (e.g., no or minimal influence) in classifying the malware sample. Stated differently, some of the triggered rules in the first sequence of rules may constitute "white noise" during classification. Removal of "white noise" rules enhances the overall accuracy in malware classification.

A malware sample is classified based on the degree of relatedness between the chronologically ordered rules forming the rule aggregation sequence and the ordered rules for one or more rule sequences that are associated with known malware (sometimes referred to as a "reference rule sequence"). Hence, the malware sample may be assigned to a particular malware class based on an ordering of rules that are present in both the rule aggregation sequence and the reference rule sequence. According to one embodiment of the disclosure, the malware sample associated with the rule aggregation sequence may be assigned to a particular malware class based on a certain number of the chronologically ordered rules of the rule aggregation sequence corresponding to an ordering of rules of the reference rule sequence. According to another embodiment of the disclosure, the malware sample associated with the rule aggregation sequence may be assigned to a particular malware class based on (1) a certain percentage of rules that are part of the rule aggregation sequence having the same ordering as rules that are part of the reference rule sequence or (2) a total number (or a maximum number) of these chronologically ordered rules of the rule aggregation sequence having the same ordering as rules associated with the reference rule sequence. A labeling scheme may be used for classifying the malware samples into labels to account for variations in labeling context by vendors or polymorphic malware.

Terminology

In the following description, certain terminology is used to describe features of the invention. For example, in certain situations, the terms "component" and "logic" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

A component (or logic) may be software in the form of one or more software modules, such as executable code or an instance, an Application Programming Interface (API), a subroutine, a function, a procedure, an applet, a servlet, a routine, source code, object code, a shared library/dynamic link library, or even one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "object" generally refers to a collection of data, whether in transit (e.g., over a network) or at rest (e.g., stored), often having a logical structure or organization that allows for an analysis of the object for malware. During analysis, for example, the object may exhibit certain expected characteristics (e.g., expected internal content such as bit patterns, data structures, etc.) and, during processing, conduct certain expected behaviors. The object may also exhibit unexpected characteristics or conduct a set of unexpected behaviors that may offer evidence of the presence of malware. The object or portions thereof (hereinafter referred to as a "malware sample") may undergo more in-depth analysis to determine whether the malware sample as part of a malicious attack.

Examples of a malware sample may include data received as input or transmitted as output, which are associated with known malware or, when processed, exhibit behaviors that suggest the data is malware. The data may include related packets, where a "packet" broadly refers to as a series of bits or bytes having a prescribed format. According to one embodiment, the related packets may include network-based packets, frames, cells, addressable memory locations, or the like. The malware sample may correspond to a collection of data that may take the form of a number of packets carrying related payloads, e.g., a single webpage received over a network. Alternatively, the malware sample may be a file retrieved from a storage location over an interconnect.

As a self-contained element, the malware sample may be an executable (e.g., an application, program, segment of code, dynamically link library "dll", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "behavior" should be generally construed as an activity conducted by the malware sample when processed by a software component running on the electronic device (e.g., instance processing the malware sample within a virtual machine, instance processed outside a sandbox environment, etc.), where the activity has been selected for monitoring. The activity may cause an undesired action to occur, such as violating or complying with a predefined rule of operation.

The term "electronic device" should be generally construed as electronics with the data processing capability and a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

The term "malware" may be broadly construed as information, in the form of software, data, or one or more commands, that are intended to cause an undesired behavior, where the behavior is deemed to be "undesired" based on customer-specific rules, manufacturer-based rules, and any other type of rules formulated by public opinion or a particular governmental or commercial entity. This undesired behavior may operate as an exploit that takes advantage of a vulnerability, which results in a communication-based anomaly or an execution-based anomaly described above. Normally, an exploit attack is an attempt to gain control of a targeted electronic device.

The term "interconnect" may be construed as a physical or logical communication path between two or more electronic devices. For instance, the communication path may include wired and/or wireless transmission mediums. Examples of wired and wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

General System Architecture

Referring now to FIG. 1, an exemplary block diagram of an electronic device 100 (e.g., security appliance, endpoint device, etc.) is shown, where the electronic device 100 is configured with a threat detection system that is adapted to detect and classify malware based on substantial similarities between a chronologically ordered sequence of rules associated with a malware sample under analysis and the ordered sequence of rules exhibited by known (classified) malware. Herein, the electronic device 100 comprises one or more hardware processors (referred to as "processor(s)") 110, a memory 120, one or more network interfaces (referred to as "network interface(s)") 130, and one or more network devices (referred to as "network device(s)") 140 connected by a system interconnect 150, such as a bus. These components are at least partially encased in a housing 160, which is made entirely or partially of a rigid material (e.g., hardened plastic, metal, glass, composite, or any combination thereof) that protects these components from atmospheric conditions.

The processor(s) 110 is a multipurpose, programmable device that accepts digital data as input, processes the input data according to instructions stored in its system memory, and provides results as output. One example of a processor may include an Intel® x86 central processing unit (CPU) with an instruction set architecture. Alternatively, a processor may include another type of CPU, a digital signal processor (DSP), an Application Specific Integrated Circuit (ASIC), a field-programmable gate array (FPGA), or the like.

The network device(s) 140 may include various input/output (I/O) or peripheral devices, such as a keyboard, a keypad, a touch screen, or a mouse for example. The network interface 130 may include different types of mechanisms and/or electrical circuitry (e.g., one or more network ports, modem, network interface card "NIC", etc.). The network interface 130 provides connectivity for the electronic device 100 to a network to thereby facilitate communications to other remotely located electronic devices. To that end, the network interface(s) 130 may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS).

The memory 120 operates as system memory that may include different storage device types such as semiconductor memory (e.g., any type or random access memory, any type programmable read-only memory such as flash memory or any type of electrically erasable programmable read-only memory "EEPROM") or a storage device. Certain types of storage devices may include a solid state drive (SSD) or a hard disk drive (HDD). The memory 120 includes a plurality of locations that are addressable by the processor(s) 110 and the network interface(s) 130 for storing software components (including software applications) and data structures associated with such software components. Some of the stored software components, associated with a threat detection system described below, may include the following: a behavior reporting logic 170, a behavioral rule-matching logic 180, and/or a malware classification logic 190. It is contemplated, however, that some or all of logic 170, 180 and 190 may be hardware logic that performs the functionality described below.

According to one embodiment of the disclosure, the behavior reporting logic 170, when executed by the processor(s) 110, operates as dynamic analysis logic that processes a malware sample and monitoring logic that monitors one or more behaviors of the malware sample during such processing. For this embodiment, the behavior reporting logic 170 operates within one or more virtual machines (referred to as "VM(s)") running in the electronic device 100. The one or more virtual machines may be configured with different applications and operating systems (OSes), the same applications and different OSes, different applications and the same OSes, the same OSes but different versions of the same application, or the like. The behaviors to be monitored may be selected through placement of interception points within one or more software components running in the VM(s), where the interception points allow information to be routed to monitoring logic that resides within or outside each corresponding VM. The interception points may be placed to detect a malicious behavior, such as an unauthorized (or unexpected) attempt to access a particular file, registry or process, or even an unauthorized (or unexpected) attempt to access a network. These malicious behaviors may be time-stamped (or assigned a sequence number) and gathered as a chronological sequence that partially forms an "event summary" described below.

The behavioral rule-matching logic 180 analyzes the chronological sequence of selectively monitored behaviors of the event summary using predefined-defined rules (referred to as "correlation rules"). Compliance or non-compliance of the correlation rules may denote that the behavior is anomalous (i.e., unexpected or unwanted). The selection of the correlation rules may be based, at least in part, on the analysis mode (e.g., what device is conducting the analysis such as a forensic analysis appliance or web-based analysis appliance), the type of sample under analysis (e.g., document, executable, etc.), and a type of behaviors that are being monitored.

More specifically, operating as correlation logic, the behavioral rule matching logic 180 applies the correlation rules to the chronological sequence of behaviors to produce an output, namely a first sequence of rules triggered by the presence of certain behaviors and having a chronological order consistent with the monitored behaviors. The first sequence of rules normally is a subset of the selected correlation rules. The triggering of each rule identifies a rule violation (e.g., at least one of the sequence of behaviors fails to comply with a rule where compliance denotes non-malicious (expected) behavior) or a rule compliance (e.g., at least one of the sequence of behaviors complies with a rule where compliance denotes potential malicious (anomalous) behavior). Hence, when executed by the processor(s) 110, the behavioral rule-matching logic 180 identifies triggered rules associated with anomalous behaviors and assigns weight values to each of these triggered rules. The assigned weight values (e.g., weighting 1-10) may be based on the likelihood that the corresponding behaviors are being caused by malware. Optionally, the behavioral rule-matching logic 180 may also generate a description of the anomalous behaviors in a form of an alphanumeric message for transmission to a selected administrator.

Once the analysis is completed and the first sequence of rules is determined, the behavioral rule-matching logic 180 selects only the rules within the first sequence of rules having weight values greater than or equal to a prescribed weight value (e.g., rules with "non-zero" weighting, rules with weight values greater than less than a prescribed weighting of "2", etc.). Stated differently, the behavior rule matching logic 180 removes the triggered rules with weight values less than the prescribed weight value to concentrate subsequent classification analysis on those rules having a stronger likelihood of being associated with behaviors caused by malware and having greater significance in malware classification. This produces a sub-sequence of the first sequence of rules, which is referred to as the "rule aggregation sequence". An output, including one or more the rule aggregation sequences along with their corresponding representation of the sample (e.g., hash value) and aggregate weight value, is provided to the classification logic 190.

The malware classification logic 190 may operate in a training mode or a testing mode. When operating in a training mode, the malware classification logic 190 is configured to generate a malware training dataset. The malware training dataset is a collection of malware samples each comprising (1) a representation of the sample (e.g., hash value), (2) type designation (e.g., file, executable, etc.), (3) the reference rule sequence, and (4) the class name or label of the malware. The malware training dataset serves as the reference ground truth to which everything from the malware test set is compared.

One classification scheme involves an analysis of the relatedness (similarity or difference) between (i) a filtered sequence of rules that are triggered during analysis of monitored behaviors encountered during processing of the malware sample (e.g. rule aggregation sequence) and (ii) at least one reference rule sequence. A degree of relatedness needed for classification of the malware sample to a particular malware class may be reached based on either (i) at least a certain percentage of rules (and their ordering) of the rule aggregation sequence are identical or substantially similar to the rules (and their ordering) of the reference rule sequence, or (ii) both sequences feature a sub-sequence of chronologically ordered rules that exceeds a predetermined number of rules. In response to determining that the rule aggregation sequence is related to a particular reference rule sequence, the sample is classified as part of the same malware class represented by the reference rule sequence.

In order to maintain uniform labeling for a malware sample that may be associated with different labels from different security vendors (e.g., anti-virus "AV" vendors), a universal label may be generated and assigned to that malware sample or cluster of malware samples. The universal label may be a combination of labels used by of the different security vendors to ensure consistent designation of malware classes.

When operating in testing mode, the classification logic 190 is configured to analyze malware samples that are part of the malware test set, namely a dataset of malware samples each comprising (1) a representation of the sample (e.g., hash value), (2) type designation (e.g., file, executable, etc.), and (3) the rule aggregation sequence. This dataset would be created from malware binaries which are confirmed as being associated with malicious behaviors as described above. The classification logic 190 iterative fetches information associated with the malware samples and performs a sequence comparison measurement, such as a Longest Common Subsequence (LCS)-based similarity measurement for example, to identify classes for malware samples associated with rule sequences that are similar to a reference rule sequence associated with one or more malware training datasets. In general, the classification involves an analysis of the degree of relatedness between (i) a sequence of rules (e.g., rule aggregation sequence) where the rules are triggered during analysis of monitored behaviors encountered during processing of the malware sample and (ii) reference rule sequences. When the degree of relatedness exceeds a threshold (e.g., certain percentage of rules that are part of the rule aggregation sequence having the same ordering as the rules that are part of a reference rule sequence, meeting or exceeding a prescribed number of these chronologically ordered rules of the rule aggregation sequence having the same ordering as the rules associated with the reference rule sequence, etc.), the malware sample may be assigned a particular malware class (family) that is identified in accordance with a labeling scheme that is dependent on whether or not the sample is already labeled.

In summary, according to one embodiment of the disclosure, the classification logic 190, operating in cooperation with the behavior reporting logic 170 and the behavioral rule-matching logic 180, is configured to classify malware samples based on the degree of relatedness between the chronologically ordered rules of the rule aggregation sequence for that malware sample and the ordered rules of a reference rule sequence.

The memory further comprises an operating system (OS) 195 that is resident in memory 120 and, when executed by the hardware processor(s) 110, functionally organizes the electronic device 100 by, inter alia, invoking operations that support operations by the behavior reporting logic 170, the behavioral rule-matching logic 180, and the classification logic 190. Examples of types of OSes may include, but are not limited or restricted to the following: (1) a version of a WINDOWS® series of operating system; (2) a version of a MAC OS® or an IOS® series of operating system; (3) a version of a LINUX® operating system; or (4) a versions of an ANDROID® operating system, among others. Although not shown, the memory 120 comprises one or more applications that are responsible for processing different sample types as well as virtual system resources. The applications may include different word processing applications (e.g., WORD®, etc.), PDF reader applications, one or more web browsers (e.g., EXPLORER®, CHROME®, etc.), or the like. The virtual system resources operate as a logical representation (and virtualization) of certain system resources such as a virtual CPU (vCPU), a virtual network interface controller (vNIC), or a virtual machine monitor (sometimes referred to as a "VMM" or a "hypervisor").

Architecture of the Threat Detection System

Figure 2:
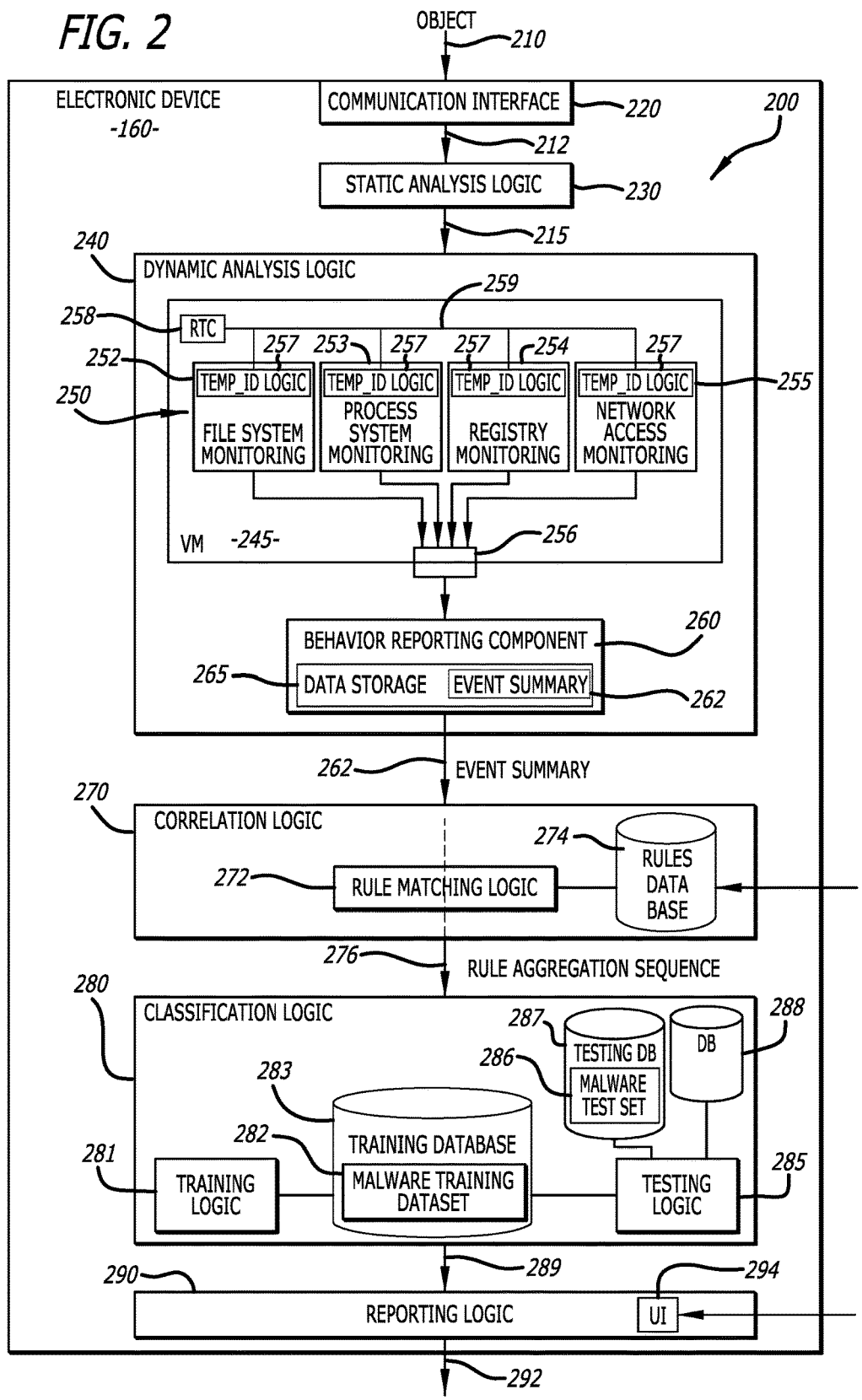
FIG. 2 is a first embodiment of the electronic device of FIG. 1 employing a threat detection system that conducts rule-based behavior analysis for malware family classification.

As shown in FIG. 2, a first embodiment of the electronic device 100 employing a threat detection system 200 is shown. The threat detection system 200 operates within the electronic device 100 and is adapted to analyze incoming data (e.g., network traffic propagating over a network, input data from another type of transmission medium including a dedicated transmission medium, etc.). According to this illustrative embodiment, the threat detection system 200 may be communicatively coupled with a network through a communication interface 220, where the network may include a public network such as the Internet, a private network (e.g., a local area network "LAN", wireless LAN, etc.), or a combination thereof. The communication interface 220 may operate as (or operate in cooperation with) a data capturing device that intercepts (or alternatively duplicates) at least a portion of the received data, namely an incoming object for analysis and, in some case, the metadata associated with the object (hereinafter generally referred to as an "object"). Alternatively, the communication interface 220 may be configured to receive files or other types of objects with different formats that are not provided over a network. For instance, as an illustrative example, the communication interface 220 may be a data capturing device that automatically (or on command) accesses data stored in a storage system or another type of interface, such as a port, for receiving samples manually provided via a suitable dedicated communication link or from storage media such as portable flash drives.

In some embodiments, as shown, the communication interface 220 may be contained within the electronic device 100 as part of the threat detection system 200. In other embodiments, the communication interface 220 can be integrated into an intermediary device in a communication path for network traffic (e.g., an optional firewall, router, switch or other networked electronic device) or can be a standalone component, such as an appropriate commercially available network tap.

For this illustrative embodiment, however, the communication interface 220 may be configured to capture the received data, namely an incoming object 210. Metadata associated with the object (captured with the object or subsequently generated) may be used, at least in part by logic within the threat detection system 200, to determine protocols, application types and other information which may be used to determine a particular software profile for use in virtual machine (VM) configuration and/or VM operation scheduling. For instance, one or more software profiles may be used for selecting and/or configuring one or more virtual machines, such as VM 245 operating as part of the dynamic analysis.

As further shown in FIG. 2, the threat detection system 200 includes some or all of the following components: communication interface 220, static analysis logic 230, dynamic analysis logic 240, correlation logic 270, classification logic 280, and/or reporting logic 290. Herein, according to this embodiment of the disclosure, the communication interface 220 receives the object 210 and converts that object 210 into a format, if needed or as appropriate, on which scanning may be conducted by the static analysis logic 230. This conversion may involve some form of de-obfuscation, such as decompression of at least a portion of the object 210 for example. It is contemplated that the communication interface 220 may conduct decompilation, disassembly or other de-obfuscation activities on the object 210 and/or extraction of specific data associated with the object 210. However, as shown below, the de-obfuscation and data extraction activities may be handled by logic within the static analysis logic 230.

Referring still to FIG. 2, the static analysis logic 230 is responsible for extracting and/or generating metadata contained within and/or associated with incoming data (e.g., formatted object 212) from the communication interface 220 (e.g., network traffic, downloaded data). As described above, the metadata may be subsequently used for configuring one or more VMs, such as VM 245 as shown, for conducting a dynamic analysis of a sample. The static analysis logic 230 analyzes characteristics of the formatted object 212. Such analysis may involve the performance of one or more checks on the formatted object 212 without its execution. Examples of the checks may include signature matching to conduct (a) exploit signature checks, which may be adapted to compare at least a portion of the formatted object 212 with one or more pre-stored exploit signatures (pre-configured and predetermined attack patterns) from signature database (not shown), and/or (b) vulnerability signature checks that may be adapted to uncover deviations in messaging practices (e.g., non-compliance in communication protocols, message formats or ordering, and/or payload parameters including size). Other examples of these checks may include (i) heuristics, which is based on rules or policies as applied to the formatted object 212 and may determine whether one or more portions of the formatted object 212 is associated with an anomalous or suspicious characteristic (e.g., a particular URL associated with known exploits, or a particular source or destination address etc.) associated with known exploits; or (ii) determinative rule-based analysis that may include blacklist or white list checking.

Upon static analysis of the characteristics of the formatted object 212, the static analysis logic 230 determines whether this object 212 is "suspicious," namely whether the object 212 has characteristics that suggest it may be associated with a malicious attack. Thereafter, the static analysis logic 230 may pass some or all of the information pertaining to the object 212, referred to as a "malware sample" 215, to the dynamic analysis logic 240 for more in-depth analysis by the VM 245.

According to one embodiment of the disclosure, the dynamic analysis logic 240 features one or more VMs, where each VM generally simulates the processing of the sample 215 within a run-time environment. For instance, as shown, the VM 245 is configured to process the malware sample 215 and monitor selective behaviors of the malware sample during such virtual processing. Monitoring logic 250 may be positioned within the software components operating with the VM 245 or operating in conjunction with these software components to monitor for certain selected behaviors performed by the malware sample 215 during processing. Such monitoring may include capturing information associated with these monitored behaviors along with maintaining an ordering of the occurrences of these behaviors. According to one embodiment of the disclosure, the monitoring logic 250 may include file system monitoring logic 252, process monitoring logic 253, registry monitoring logic 254 and/or network access monitoring logic 255.

For instance, the monitoring logic 250 may be used to detect one or more malicious behaviors (e.g., anomalous behavior), such as unexpected attempts to access or modify a particular file, a particular process, or a particular registry. The occurrence of these behaviors also may trigger a gathering of salient information by the monitoring logic 250, including state information. Examples of the state information may include (1) information directed to software components running in the virtual machine or the malware sample 215 being processed (e.g., running application name, version number, file type, object type, etc.) and (2) information directed to one or more behaviors (e.g., path, detected behavior name, etc.).

According to one embodiment of the disclosure, temporal identification logic 257 may be located within the monitoring logic 250, where the temporal identification (temp_id) logic 257 assigns an identifier to the detected malicious behavior and/or the salient information associated with the detected malicious behavior, where the identifier may be used in the chronological sequencing (or ordering) of behaviors received by the monitoring logic 250. Examples of various types of identifiers may include a time-stamp that is based on a current time as measured by a real-time clock (RTC) 258 communicatively coupled via interconnect 259 to the file system monitoring logic 252, the process monitoring logic 253, the registry monitoring logic 254 and/or the network access monitoring logic 255. Alternatively, the identifier may include a sequence number as generated by a monotonic counter for example. Connectivity to a common time source (or a counting source such as a monotonic counter) ensures that the chronological ordering of the behaviors.

A communication port 256 may be configured to order the behaviors and/or their salient state information in a chronological sequence (or ordering) based on their identifiers. As described above, the various types of identifiers may include a monotonic sequence number, a time-stamp, or the like. The salient information associated with the behaviors along with their corresponding identifiers are routed to a behavior reporting component 260, which organizes the behaviors chronologically in a prescribed format with their other salient information (referred to as an "event summary 262"). It is contemplated that, in lieu of deployment of the temporal identification logic 257, the behavior reporting component 260 may be configured to assign the identifier for chronological ordering of the monitored behaviors. The event summary 262 may be stored in a data store 265 until provided to the correlation logic 270.

Referring still to FIG. 2, the correlation logic 270 comprises rule matching logic 272, which analyzes the chronological sequence of behaviors from the event summary 262 using correlation rules stored in rules database 274, where compliance or non-compliance of the correlation rules denotes that the behavior under analysis is anomalous (e.g., unexpected communication or execution). The type of correlation rules may vary depending on the type of analysis being conducted, as different types of appliances perform different types of analyses and the analysis may be directed to different types of malware samples (e.g., document, executable, etc.). The type of correlation rules may also vary based on the type of behaviors being monitored.

The rules matching logic 272 applies the correlation rules to the sequence of behaviors that are part of the event summary 262 to initially produce, at least in part, the first sequence of rules that are triggered for each malware sample (being part of the "rule sequence report"). The triggering of each rule denotes a rule violation (e.g., at least one of the sequence of behaviors failed to comply with a rule where compliance denotes expected, non-malicious behavior) or a rule compliance (e.g., at least one of the sequence of behaviors complied with a rule where compliance denotes malicious behavior). The rules matching logic 272 assigns weight values to each triggered rule of the first sequence of rules based on the probability of that the corresponding behavior is associated with malware.

Based on the first sequence of rules, the rule matching logic 272 produces an output, referred to as a rule aggregation output 276, which includes a subset of the triggered correlation rules forming the first sequence of rules (sometimes referred to as the "rule aggregation sequence"). More specifically, when executed by the processor(s) 110, the rules matching logic 272 produces the rule aggregation sequence by selecting only the rules assigned with weight values greater than or equal to a prescribed weight value (e.g., rules with "non-zero" weighting or weighting less than prescribed value). Hence, rules associated with benign behaviors (e.g., "zero" weight values) are removed from the first sequence of rules to produce the rule aggregation sequence. It is contemplated that the types and/or number of rules set forth in the rule aggregation sequence may be useful in subsequent determinations as to the maliciousness of a sample under analysis.

Additionally, the rule matching logic 272 may also generate a description of the malicious behavior associated with the output in a form of an alphanumeric message for reporting purposes as part of the rule aggregation output 276. Hence, the rule aggregation output 276, on a per malware sample basis, may comprise the rule aggregation sequence, an analysis type (described below), an aggregate weight value for the rules of the rule aggregation sequence, and a representation for the malware sample (e.g., hash value, assigned sample identifier, etc.). The rule aggregation output 276 is supplied to the classification logic 280.

In receipt of the rule aggregation output 276, the classification logic 280 comprises a training logic 281 and a testing logic 285. When the classification logic 280 is operating in a first (training) state, the training logic 281 receives the rule aggregation sequence, normally a plurality of triggered rules associated with one or more malicious behaviors detected by the dynamic analysis logic 240. Herein, the training logic 281 creates a malware training dataset 282 for storage within a first (training) database 283 by identifying unique behaviors represented by a unique sequence of correlation rules. The unique sequence of correlation rules, which is a portion of the rule aggregation sequence, may be included as part of the malware training dataset 282. The representation for the malware sample (e.g., hash value), type designation (e.g., file, executable, etc.), and/or the class name or label of the malware may also be included as part of the malware training dataset 282.

Additionally, a class label may be assigned to the malware testing dataset 282. The class label may be determined by querying a label database (not shown) that includes labels for all known malware classes, where the representation for the malware sample may operate as a look-up parameter. The label database may be off-site database that maintains an aggregation of malware class labels and signatures from security vendors. A response to the query to the label database may include one or more known malware class labels that are used by different security vendors to identify the dataset associated with the sample 215. The training logic 281 determines a class label for the malware training dataset 282 based on a label used by a majority of the security vendors in accordance with the label database.

When the classification logic 280 is operating in a second (testing) state, the testing logic 285 receives the rule aggregation output 276, which includes the rule aggregation sequence, which temporarily stores one or more malware test sets 286 in a second (testing) database 287. Herein, as described above, the testing logic 285 classifies each malware sample by conducting a sequence comparison measurement, such as a Longest Common Subsequence (LCS)-based similarity measurement for example, to identify classes of malware samples that exhibit similar rule sequences as the rule aggregation sequence and stored in a results database 288. An analysis of the degree of relatedness between the rule aggregation sequence associated with the particular malware sample and one or more reference rule sequences set forth in the malware training datasets is conducted to determine whether the malware sample can be classified. Where the degree of relatedness exceeds a certain threshold (e.g., a certain percentage of matching rules with similar ordering, certain number of these chronologically ordered rules of the rule aggregation sequence correspond to an ordering of the rules associated with the malware testing rule sequence, etc.), the malware sample may be mapped to represent that it is part of a particular malware class and potentially assigned a new class label as described herein.

The reporting logic 290 is configured to receive information 289 from the classification logic 285 and generate electrical (alert) signals 292, especially in response to a determination that the malware sample 215 is being now classified as malicious and part of a malware family. The electrical (alert) signals 292 may include various types of messages, which may include text messages and/or email messages, video or audio stream, or other types of information over a wired or wireless communication path. The reporting logic 290 features an optional user interface 294 (e.g., touch pad, keyed inputs, etc.) for customization as to the reporting configuration.

Figure 3:
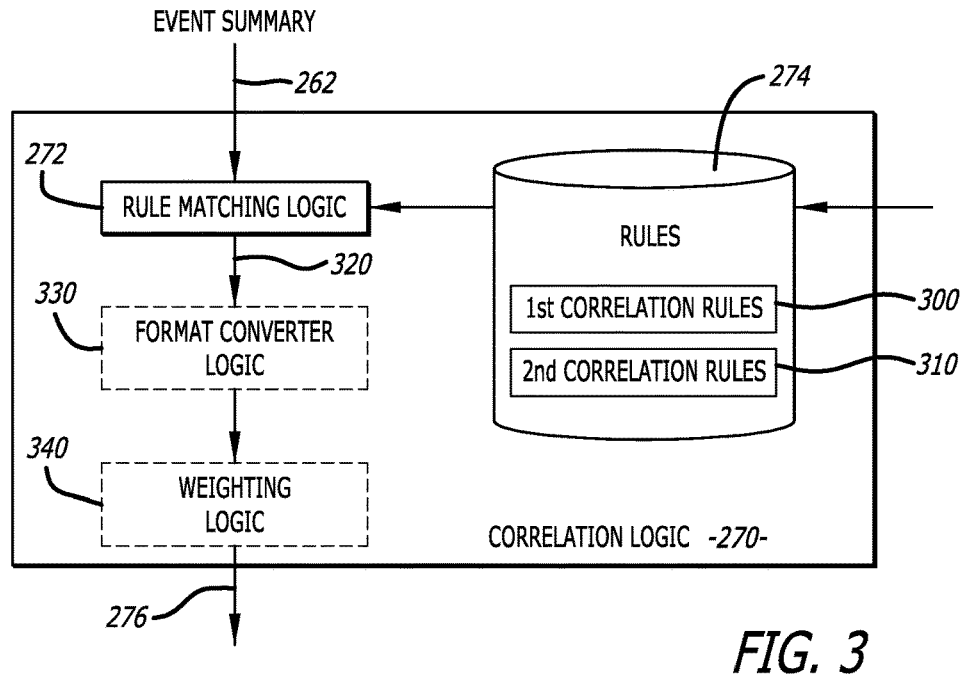
FIG. 3 is an exemplary embodiment of the correlation logic of the threat detection system of FIG. 2.

Referring now to FIG. 3, an exemplary embodiment of the correlation logic 270 of the threat detection system 200 of FIG. 2 is shown. Herein, the correlation logic 270 comprises the rule matching logic 272, which analyzes the sequence of behaviors from the event summary 262 using correlation rules stored in the rules database 274. The rules database 274 comprises one or more sets of correlation rules, where each set of correlation rules may correspond to an analysis type conducted by the electronic device. For instance, a first set of correlation rules 300 stored within the rules database 274 may be applicable to the electronic device 100 of FIG. 2 operating as a web-based security appliance (first analysis type) while a second set of correlation rules 310 stored within the rules database 274 may be applicable to the electronic device 100 of FIG. 2 operating as a forensic-analysis appliance (second analysis type).

The rule database 274 is modifiable, where the first set of correlation rules 300 may be updated by a network administrator with sufficient credentials or automatically updated on a periodic or aperiodic basis. For instance, the correlation rule updates may be conducted on a subscription-basis with daily, weekly or monthly updates. As an example, these updates may involve one or more correlation rules being added to the first set of correlation rules 300. Alternatively, one or more correlation rules may be deleted from the first set of correlation rules 300 or substituted for one or more rules currently part of the first set of correlation rules 300.

Based on the analysis of the sequence of behaviors from the event summary 262 using correlation rules stored in the rules database 274, the rules matching logic 272 generates the first sequence of rules 320 that is triggered for each malware sample. The first sequence of rules 320 undergoes format conversion by format converter logic 330 for placement into a format readable by the classification logic 280. Additionally, a weighting logic 340 may assign weight values to each rule of the first sequence of rules 320 as well as an aggregate weight value for the entire sequence of rules associated with a particular malware sample. The weight value (and aggregate weight value) represents the probability of the behavior that corresponds to the triggered rule or rules being associated with malware. The formatted sequence of rules (e.g., rule aggregation sequence of FIG. 2) and corresponding weight values are provided as part of the rule aggregation output 276, which is supplied from the correlation logic 270 to the classification logic 280.

General Operational Flows

Figure 4:
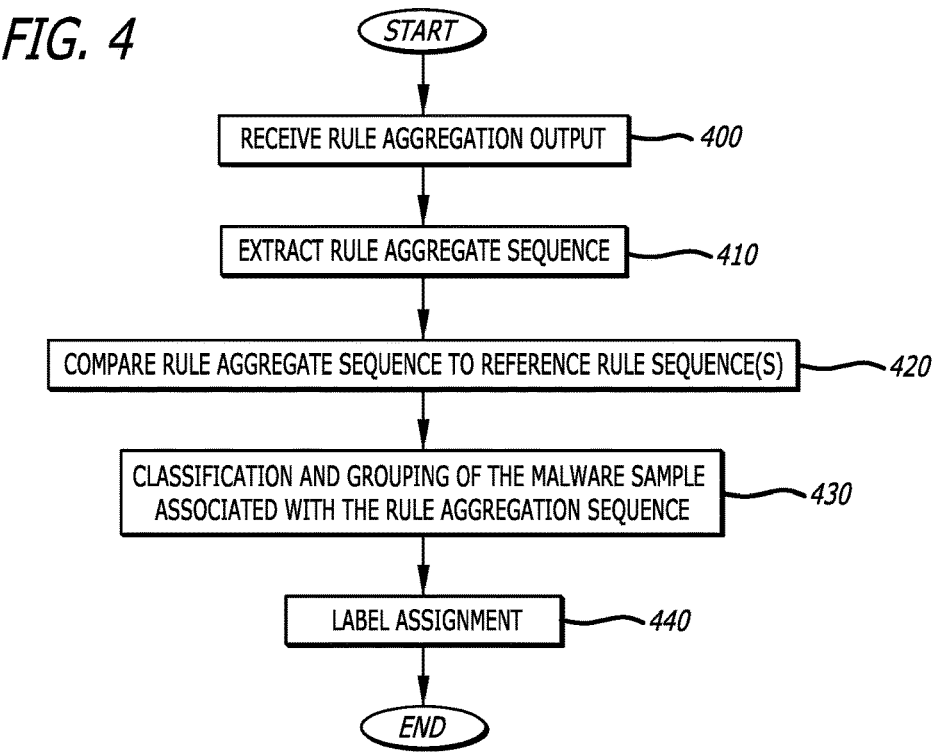
FIG. 4 is an embodiment of an operational flow of the classification logic operating as part of the threat detection system of FIG. 2.

Referring now to FIG. 4, an embodiment of an operational flow of the classification logic 280 of FIG. 2 operating as part of the threat detection system 200 is shown. Herein, the operational flow includes (1) rule sequence extraction; (2) rule sequence comparison; (3) grouping (clustering) of malware samples based on rule sequence relatedness; and (4) label assignment. More specifically, for each malware sample, the sequence of correlation rules that is part of the rule aggregation output 276 and associated with a particular malware sample (referred to as the "rule aggregation sequence") is extracted for analysis with one or more sequences of rules associated with malware training datasets that are associated with known malware (hereinafter "reference rule sequence(s)"), as illustrated in items 400 and 410.

Thereafter, the rule aggregation sequence is analyzed using the reference rule sequence(s) as illustrated in block 420. This analysis may be conducted through a LCS-based similarity analysis or any other sequence analysis technique to identify particular sections of the rule aggregation sequence that exhibit similar or identical rule sequences as found in the reference rule sequence(s). For example, during such analysis, relatedness may be detected when a certain percentage of chronologically ordered rules of the rule aggregation sequence are determined to correspond to the ordered rules of the reference rule sequence(s). As another example, during such analysis, relatedness may be detected when a prescribed number of rules within the rule aggregation sequence occur in the same order as a prescribed number of rules within the reference rule sequence(s).

In response to determining the relatedness between the rule aggregation sequence associated with the particular malware sample and at least one of the reference rule sequences, the malware sample is classified in accordance with any of three classification schemes with label assignments as needed (items 430 and 440). The first classification scheme is where the malware sample is determined to be from the same malware class as the malware sample from a particular malware training dataset based on the LCS-based relatedness score. This is determined to be a positive observation and the malware sample is classified accordingly. If the rule aggregation sequence is related to the reference rule sequence, but the classes are different, then the labels associated with these classes are merged to form a "super-class" (e.g., new class label derived from multiple class (family) names) and details of the superclass is added to the malware training dataset. In the event that the relatedness between the rule aggregation sequence and the reference rule sequence does not satisfy a prescribed threshold of relatedness (i.e. low or no similarity), the observation is considered a false (negative) observation and the malware sample is not classified.

In accordance with a second classification scheme, a new unlabeled sample is tested in connection with a labeled malware training dataset. As described above, the rule aggregation sequence of the unlabeled sample is compared to one or more reference rule sequences to determine the relatedness between these sequences. Where the degree of relatedness exceeds a threshold level (e.g., a certain percentage of matching rules with similar ordering, a certain number of these chronologically ordered rules of the rule aggregation sequence is also found in the reference rule sequence of the particular malware training dataset, etc.), the malware sample is classified according to the malware training dataset class.

In accordance with a third classification scheme, all undetected, unlabeled malware samples from the first or second classification schemes are added to the undetected dataset. Thereafter, in order to identify and label classes, the clusters of malware samples that exhibit similarities with each other based on their rule-sequence behavior are clustered. This may be conducted in accordance with a LCS-based clustering operation as described above. For each cluster of malware samples within the undetected dataset, a random name is generated and assigned to that cluster. The cluster is subsequently validated, potentially off-line and manually by a malware analysis, and an associated label is assigned to that cluster. Thereafter, information associated with that cluster would be added as part of the malware training dataset in order to improve classification.

Figure 5:
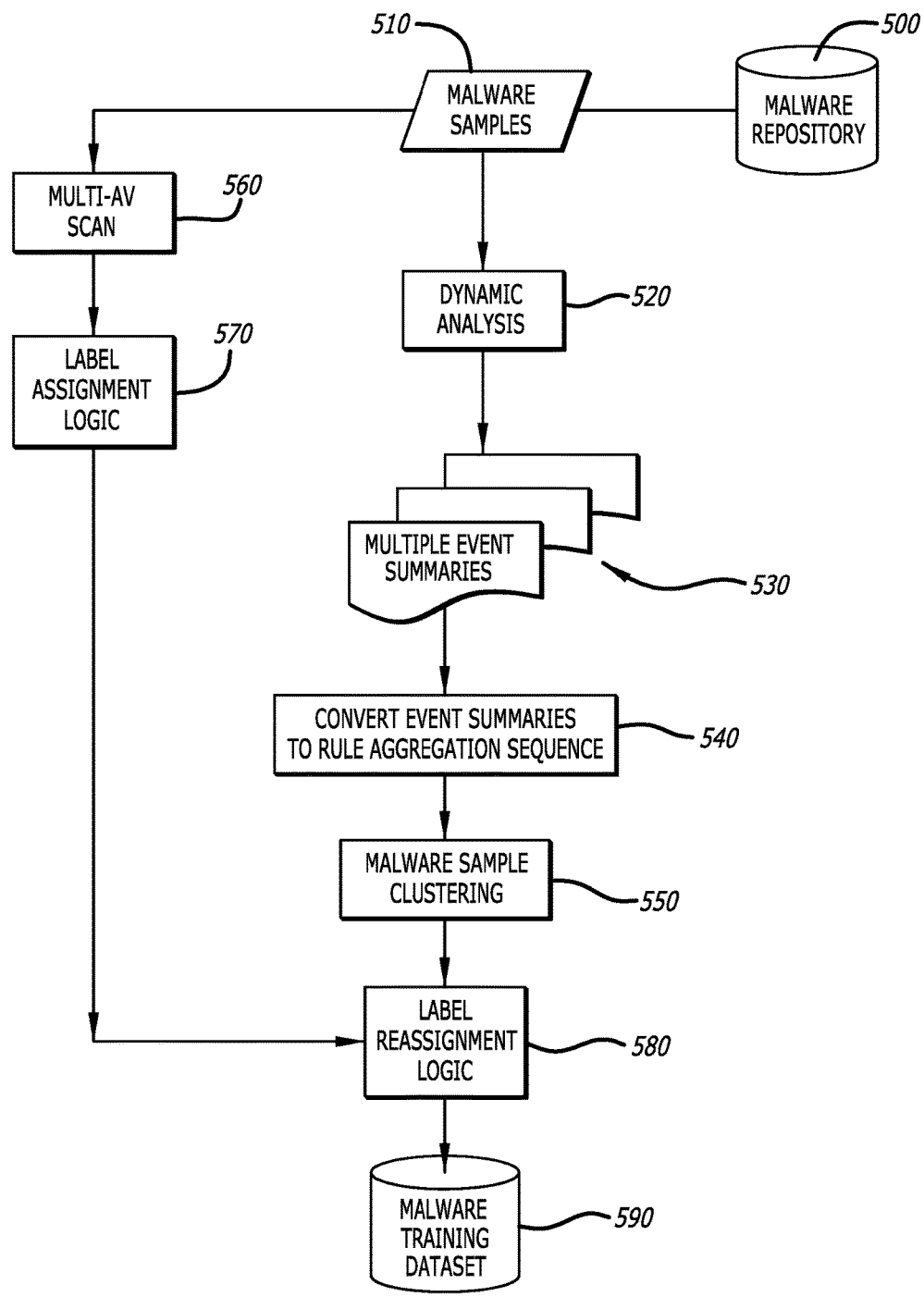
FIG. 5 is an exemplary embodiment of the operability of the training logic within the classification logic operating as part of the threat detection system of FIG. 2.

Referring now to FIG. 5, an exemplary embodiment of the operability of the threat detection system for generating malware training datasets is shown. Herein, malware samples from a malware repository 500 (e.g., malware samples generated with the electronic device 100 of FIG. 1, malware samples from other sources, etc.) undergo a dynamic analysis (items 510 and 520). The dynamic analysis may conduct virtual processing of the malware samples within one or more virtual machines that include monitoring logic for gathering information associated with those behaviors of the samples being monitored. Alternatively, the dynamic analysis may feature actual processing of the samples with a security agent capturing selected behaviors. Both of these analyses produce corresponding event summaries (item 530). Each of the event summaries includes a chronological sequence of detected behaviors presented in a prescribed format. The behaviors associated with each event summary are analyzed by applying correlation rules to the chronological sequence of detected behaviors to generate a sequence of rules that are triggered in response to a presence of certain behaviors. This sequence of triggered rules corresponds to the "first sequence of rules" described above. From the first sequence of rules, identifiers for the rules triggered for each malware sample are extracted and formatted into a rule aggregation sequence for subsequent classification operations (item 540).

According to one embodiment of the disclosure, the rule aggregation sequence includes a subset of rules within the first sequence of rules. The rule aggregation sequence is configured to exclude triggered rules that appear to have lesser significance in detecting whether a malware sample includes malware and classifying the malware sample (i.e., the triggered rules operating as "white noise" during classification).

Thereafter, the malware sample is classified based on an analysis of the rule aggregation sequence to a sequence of rules that are associated with known malware (item 550). Hence, the malware sample associated with the rule aggregation sequence may be assigned to a particular malware class (and/or clustered with other malware samples) based on an ordering of rules that are present in both the rule aggregation sequence and the sequence of rules associated with known malware. According to one embodiment of the disclosure, the malware sample associated with the rule aggregation sequence may be assigned to a particular malware class based on a certain number of the chronologically ordered rules within the rule aggregation sequence corresponding to an ordering of rules within the reference rule sequence that operates as a fingerprint for that particular malware class. According to another embodiment of the disclosure, the malware sample associated with the rule aggregation sequence may be assigned to a particular malware class based on a certain percentage, a total number or a maximum sequential number of these chronologically ordered rules within the rule aggregation sequence corresponding to an ordering of the rules associated with the reference rule sequence for that particular malware class. This assignment clusters malware samples associated with a similar sequence of rule violations (or rule compliance) together to form an updated (or new) malware class.

Additionally, the updated (or new) malware class may require re-labeling to formulate a universal label, where the malware samples have been labeled differently by different security vendors (items 560, 570 and 580). This may be determined through a scanning operation (e.g., multiple anti-virus "AV" scan), which is conducted by scanning logic (e.g., part of the classification logic 190) that reviews the label database for labels associated with known malware, perhaps from different security vendors, having a signature similar to the binary of the malware sample (item 560). If one or more labels are uncovered, the label used by a majority of the security vendors may be passed to the label assignment logic along with other labels that may be used for similar malware samples (item 570). The universal label construct may be a full or partial aggregation of these different labels (item 580). The resultant data, which may include a representation of the malware sample, the newly created (universal) label, and the rule sequence is stored as part of a malware training dataset (item 590).

Figure 6:
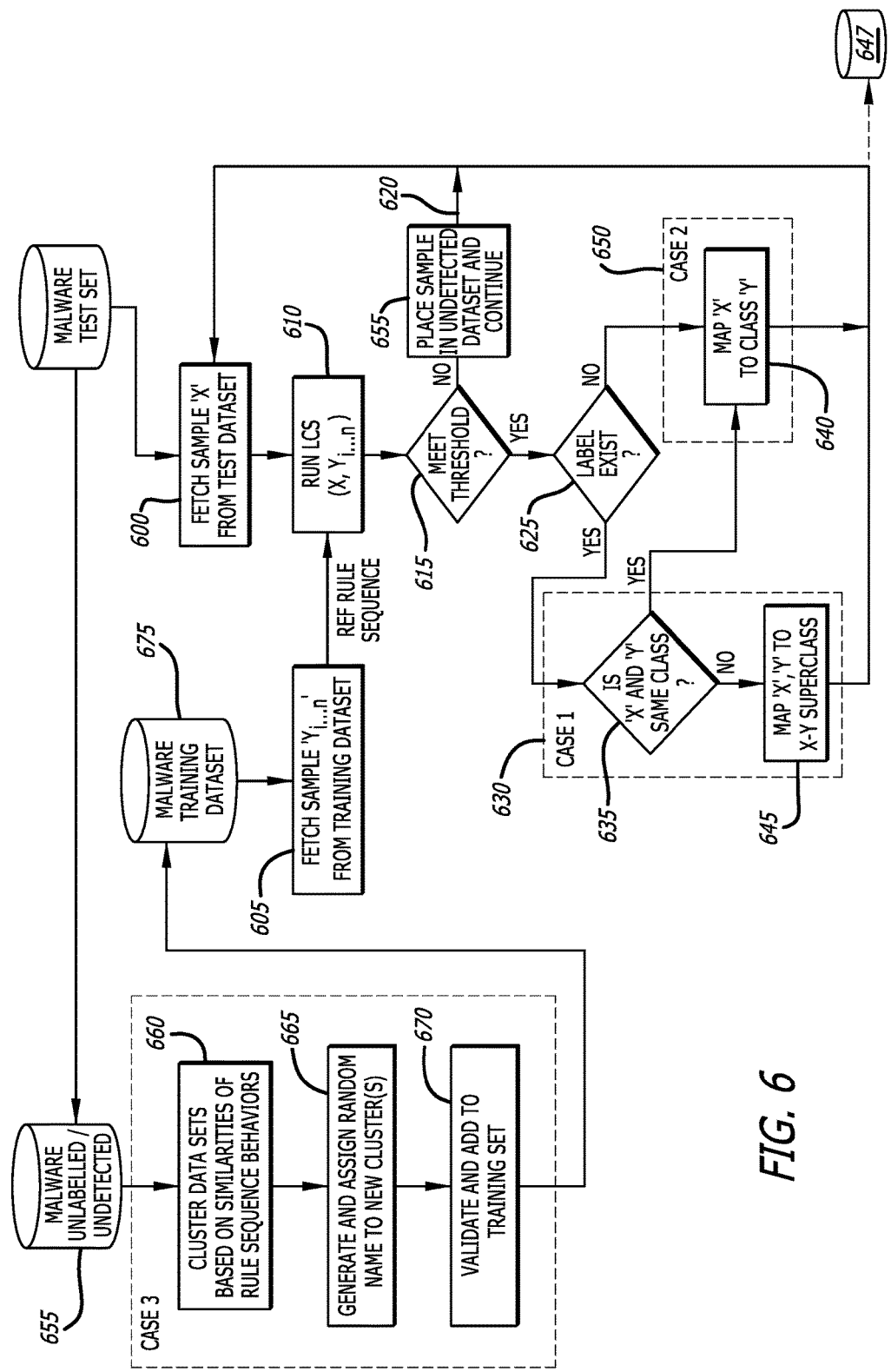
FIG. 6 is an exemplary embodiment of the operability of the testing logic within the classification logic operating as part of the threat detection system of FIG. 2.

Referring now to FIG. 6, an exemplary embodiment of the operability of the testing logic 285 of FIG. 2 within the classification logic of the threat detection system is shown. The testing logic 285 is responsible for classifying malware samples that are part of a stored malware test set. Herein, information pertaining to a malware sample from the malware test set is fetched and a comparison may be conducted through a LCS-based similarity (relatedness) analysis between particular sections of the rule aggregation sequence associated with the malware sample and a sequence of rules stored as part of the malware training dataset (referred to as "reference rule sequence"), as illustrated in items 600, 605 and 610. During this operation, a determination is made as to the degree of relatedness between the rule aggregation sequence for the malware sample and the reference rule sequence (item 615). As an example, the degree of relatedness may be based, at least in part, on the percentage of chronologically ordered rules within the rule aggregation sequence that are determined to correspond to the ordered rules of the reference rule sequence. As another example, the degree of relatedness may be based, at least in part, on the length of a sub-sequence of "x" rules within the rule aggregation sequence (x≥3) that correspond to the ordered "x" rules of the reference rule sequence.

Where the degree of relatedness does not exceed a threshold (e.g., less than a prescribed percentage or no series of "x" rules matching the ordered rules of the reference rule sequence), the malware sample is not classified and is added as part of the undetected dataset as an unlabeled malware sample (see item 655). This testing process repeats for another malware sample (item 620). However, where the degree of relatedness exceeds the threshold, a determination is made as to whether the malware sample features a label (item 625). If so, the classification performs a first classification scheme labeled "case 1" (item 630).

The first classification scheme involves a first determination as to whether the malware sample has already been labeled to be the same class as a particular known malware (item 635). If so, this result is determined to be a positive observation and the malware sample is classified as part of the same class as the malware sample from the particular malware training dataset (item 640). Thereafter, information associated with the newly classified malware sample (e.g., rule aggregation sequence and a representation for the sample such as a hash value, assigned sample identifier, etc.)) may be stored in results database (item 647). However, if the rule sequences are similar, but the label currently associated with the malware sample is different, then a new class label is formulated (e.g., class names are merged to form a "superclass") and details of the new class label is added as part of the malware sample (item 645). Thereafter, information associated with the classified malware sample (rule aggregation sequence, a representation for the sample, etc.) may be added to the results database (item 647).

Where the degree of relatedness exceeds the threshold but the malware sample does not feature a label, the classification logic performs a second classification scheme labeled "case 2" (item 650). The second classification scheme classifies the malware sample to a class of the classified (known) malware sample.

Herein, as shown, all unlabeled malware samples are added to the undetected dataset and the classification logic performs a third classification scheme labeled "case 3" (item 655). Thereafter, in order to identify and label classes, the clusters of malware samples that exhibit similarities with each other based on their rule sequences are clustered (item 660). This may be conducted in accordance with a LCS-based clustering operation as described above. For each cluster of malware samples within the undetected dataset, a random name is generated and assigned to that cluster (item 665). The cluster is subsequently validated, potentially off-line and manually by a malware analyst or a through an automated process, and an associated label is assigned to that cluster (item 670). Thereafter, information associated with that cluster would be added as part of the malware training dataset in order to improve classification (item 675).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An electronic device comprising:
   one or more hardware processors; and
   a memory coupled to the one or more processors, the memory comprises software that, when executed by the one or more hardware processors,
   (i) analyzing a plurality of behaviors by at least monitoring the plurality of behaviors of a sample during execution within one or more virtual machines and determining compliance or non-compliance by the plurality of behaviors with a plurality of rules to generate a sequence of rules where compliance or non-compliance with each of the sequence of rules corresponds to a potential malicious behavior detected during analysis of the sample, (ii) generating a rule aggregation sequence from the sequence of rules, the rule aggregation sequence being a subset of the sequence of rules each corresponding to a behavior of the plurality of behaviors having at least a prescribed probability of being associated with malware, and (iii) attempting to classify the sample to a known malware family based on a degree of relatedness between the rule aggregation sequence and rules associated with the known malware family.

2. The electronic device of claim 1, wherein the software stored in the memory, when executed by the one or more hardware processors, attempts to classify the sample by at least comparing a chronological order of the rule aggregation sequence to a chronological order of rules associated with each of a plurality of known malware families, including the rules associated with the known malware family.

3. The electronic device of claim 1, wherein the software stored in the memory, when executed by the one or more hardware processors, further conducts the analyzing of the plurality of behaviors and conducts the determining whether the sequence of rules corresponds to the potential malicious behaviors by at least (i) organizing the monitored plurality of behaviors in accordance with a chronological order as to a time of detection, (ii) determining whether the monitored plurality of behaviors are non-compliant with a series of rules, and if so, (iii) including the series of rules as part of the sequence of rules.

4. The electronic device of claim 1, wherein the software stored in the memory, when executed by the one or more hardware processors, generating the rule aggregation sequence by at least (i) assigning a weight value to each rule of the sequence of rules and (ii) removing a rule from the sequence of rules when the weight value assigned to the rule is determined to fall below a predetermined threshold, the weight value being based on a probability of the behavior associated with malware.

5. The electronic device of claim 1, wherein the memory comprises software that, when executed by the one or more hardware processors, generates electrical alert signals to identify the sample and an identified malware family to which the sample pertains.

6. The electronic device of claim 1, wherein the software stored in the memory, when executed by the one or more hardware processors, conducts the analyzing of the plurality of behaviors to determine the sequence of rules comprises (i) organizing the monitored plurality of behaviors in accordance with a chronological order as to a time of detection, (ii) determining whether a series of the monitored plurality of behaviors are compliant with the series of rules, and if so, (iii) including the series of rules as part of the sequence of rules.

7. The electronic device of claim 1, wherein the software stored in the memory, when executed by the one or more hardware processors, generates an alert signal in response to classifying the sample as malicious and part of the known malware family.

8. The electronic device of claim 7, wherein the alert signal being a type of message including a text message or an electronic mail (email) message.

9. An electronic device comprising:
   one or more hardware processors; and
   a memory coupled to the one or more processors, the memory comprises
   dynamic analysis logic that includes components that, when executed by the one or more hardware processors, generate one or more virtual machines that are configured to process a sample and monitor a plurality of behaviors of the sample during processing within the one or more virtual machines, correlation logic that, when executed by the one or more hardware processors, (i) analyzes the plurality of behaviors of the behaviors by determining compliance or non-compliance by the plurality of behaviors with a plurality of rules to generate a sequence of rules where compliance or non-compliance with each of the sequence of rules corresponds to a potential malicious behavior detected during analysis of the sample within the one or more virtual machines, and (ii) assigns weight values to each of the sequence of rules and generates a rule aggregation sequence from the sequence of rules, the rule aggregation sequence being a subset of the sequence of rules each corresponding to a behavior of the plurality of behaviors having at least a prescribed probability of being associated with malware, and classification logic that, when executed by the one or more hardware processors and in response to determining that the sequence of rules corresponds to potential malicious behaviors, attempts to classify the sample to a known malware family based on a degree of relatedness between at least a portion of the sequence of rules and rules associated with the known malware family.

10. The electronic device of claim 9, wherein the classification logic stored in the memory, when executed by the one or more hardware processors, attempts to classify the sample by comparing a chronological order of the portion of the sequence of rules to a chronological order of unique rules associated with each of a plurality of known malware families, including the rules associated with the known malware family.

11. The electronic device of claim 9, wherein the correlation logic stored in the memory, when executed by the one or more hardware processors, analyzes the plurality of behaviors by determining whether the sequence of rules corresponds to the potential malicious behaviors by performing operations that comprises (i) monitoring the plurality of behaviors of the sample during execution within the one or more virtual machines, (ii) organizing the monitored plurality of behaviors in accordance with a chronological order as to a time of detection, (iii) determining whether a series of the chronologically ordered, monitored plurality of behaviors are non-compliant with a series of rules included as part of the plurality of rules, and if so, (iv) including the series of rules as part of the sequence of rules.

12. The electronic device of claim 11, wherein the series of rules depend on a type of the sample where a first series of rules associated with an executable operating as the sample is different from a second series of rules associated with a Portable Document Format (PDF) document.

13. The electronic device of claim 11, wherein the series of rules depend on a type of the electronic device where a first series of rules associated with a first type of security appliance is different from a second series of rules associated with a second type of security appliance.

14. The electronic device of claim 11, wherein the correlation logic stored in the memory, when executed by the one or more hardware processors, assigns the weight value to each rule of the sequence of rules and removes a rule from the sequence of rules when generating the rule aggregation sequence when the weight value assigned to the rule is below a predetermined threshold.

15. The electronic device of claim 9, wherein the memory further comprises a reporting logic that, when executed by the one or more hardware processors, generates electrical alert signals to identify the sample and an identified malware family to which the sample pertains.

16. The electronic device of claim 15, wherein the reporting logic further comprises a user interface to allow for customer customization as to a configuration of the alert signals in a text message format or an electronic mail (email) message format.

17. The electronic device of claim 9, wherein the correlation logic stored in the memory, when executed by the one or more hardware processors, generates the sequence of rules by performing operations that comprises (i) monitoring the plurality of behaviors of the sample during execution within the one or more virtual machines, (ii) organizing the monitored the plurality of behaviors in accordance with a chronological order as to a time of detection, (iii) determining whether a series of the chronologically ordered, monitored the plurality of behaviors are compliant with a series of rules being part of the plurality of rules, and if so, (iv) including the series of rules as part of the sequence of rules.

18. An electronic device comprising:
one or more hardware processors; and
a memory coupled to the one or more processors, the memory comprises
one or more software components that, when executed by the one or more hardware processors, generates one or more virtual machines that process a sample and monitor behaviors by the sample during processing within the one or more virtual machines,
correlation logic that, when executed by the one or more hardware processors,(i) analyzes the behaviors by determining compliance or non-compliance with a series of rules to determine a sequence of rules that correspond to potential malicious behaviors detected during analysis of the sample within one or more virtual machines, and (ii) filters the sequence of rules by removal of one or more rules corresponding to one or more potential malicious behaviors having or exceeding a prescribed probability of being associated with malware, and
classification logic that, when executed by the one or more hardware processors, compares the filtered sequence of rules to unique rules associated with a known malware family.

19. The electronic device of claim 18, wherein the correlation logic stored in the memory, when executed by the one or more hardware processors, determines whether the sequence of rules correspond to the potential malicious behaviors by performing operations that comprises (i) monitoring behaviors of the sample during execution within the one or more virtual machines, (ii) organizing the monitored behaviors in accordance with a chronological order as to a time of detection, (iii) determining whether a series of the chronologically ordered, monitored behaviors are non-compliant with a series of rules, and if so, (iv) including the series of rules as part of the sequence of rules.

20. The electronic device of claim 19, wherein the series of rules selected for analysis with the series of chronologically ordered, monitored behaviors is based on a type of the sample where the series of rules comprises a first series of rules when the sample is an executable.

21. The electronic device of claim 20, wherein the series of rules comprises a second series of rules that is different from the first series of rules when the sample is a Portable Document Format (PDF) document.

22. The electronic device of claim 19, wherein memory further comprises (i) scanning logic that obtains one or more labels associated with known malware having matching characteristics to characteristics of the sample and (ii) label assignment logic to assign a label to a cluster of samples including the sample.

23. The electronic device of claim 22, the label assignment logic to assign the label that includes information associated with a label most common of the one or more labels obtained by the scanning logic.

24. The electronic device of claim 18, wherein memory further comprises reporting logic that, when executed by the one or more hardware processors, generates alert signals to identify the sample as malicious and an identified malware family to which the sample pertains.

25. The electronic device of claim 24, wherein the reporting logic further comprises a user interface to allow for customer customization as to a configuration of the alert signal in a text message format or an electronic mail (email) message format.

26. A method comprising:
monitoring a plurality of behaviors of a sample during execution within one or more virtual machines;
determining compliance or non-compliance by the plurality of behaviors with a plurality of rules to generate a sequence of rules where compliance or non-compliance with each of the sequence of rules corresponds to a potential malicious behavior detected during analysis of the sample;
generating a rule aggregation sequence from the sequence of rules, the rule aggregation sequence being a subset of the sequence of rules each corresponding to a behavior of the plurality of behaviors having at least a prescribed probability of being associated with malware; and
attempting to classify the sample to a known malware family based on a degree of relatedness between the rule aggregation sequence and rules associated with the known malware family.

27. The method of claim 26, wherein the attempting to classify the sample comprises comparing a chronological order of the rule aggregation sequence to a chronological order of rules associated with each of a plurality of known malware families, including the rules associated with the known malware family.

28. The method of claim 26, wherein the determining compliance or non-compliance by the plurality of behaviors with a plurality of rules comprises (i) organizing the monitored plurality of behaviors in accordance with a chronological order as to a time of detection, (ii) determining whether the monitored plurality of behaviors are non-compliant with a series of rules, and if so, (iii) including the series of rules as part of the sequence of rules.

29. The method of claim 26, wherein the generating of the rule aggregation sequence comprises (i) assigning a weight value to each rule of the sequence of rules and (ii) removing a rule from the sequence of rules when the weight value assigned to the rule is determined to fall below a predetermined threshold, the weight value being based on a probability of the behavior associated with malware.

30. The electric device of claim 26 further comprising generating electrical alert signals to identify the sample and an identified malware family to which the sample pertains.

31. The method of claim 30, wherein the alert signals being one or more messages that identify the sample and an identified malware family to which the sample pertains.

32. The method claim 30, wherein prior to the monitoring of the plurality of behaviors of the sample, the method further comprising:
using a user interface to customize a configuration of a message format for the alert signals.

33. The method of claim 26, wherein the determining compliance or non-compliance by the plurality of behaviors with a plurality of rules comprises (i) organizing the monitored plurality of behaviors in accordance with a chronological order as to a time of detection, (ii) determining whether a series of the monitored plurality of behaviors are compliant with the series of rules, and if so, (iii) including the series of rules as part of the sequence of rules.

* * * * *